Sept. 12, 1967  R. W. WATSON  3,341,797
DYNAMIC PRESSURE GAGE
Filed May 5, 1965

INVENTOR
RICHARD W. WATSON

BY *Ernest S. Cohen*

ATTORNEYS

United States Patent Office 3,341,797
Patented Sept. 12, 1967

3,341,797
DYNAMIC PRESSURE GAGE
Richard W. Watson, Pittsburgh, Pa., assignor to the United States of America as represented by the Secretary of the Interior
Filed May 5, 1965, Ser. No. 453,530
1 Claim. (Cl. 338—47)

The invention herein described and claimed may be manufactured and used by or for the Government of the United States of America for governmental purposes without the payment of royalties thereon or therefor.

This invention relates to a pressure sensor which is responsive to high speed changes such as those associated with explosions, shock tube reactions, or the like.

Briefly, the novel transducer of this invention comprises the combination of a carbon electrical resistance encapsulated in a resinous pressure acceptor block, and being so coupled as to have a response speed of about 0.2 microsecond.

It is the object of this invention to provide a practical and an economical means of determining the pressures associated with blast, shock, and explosive waves with a minimum of associated instrumentation and data reduction.

These and other objects and improvements of the instant invention will be seen more clearly in the description following and in the appended drawing wherein.

Figure 1:
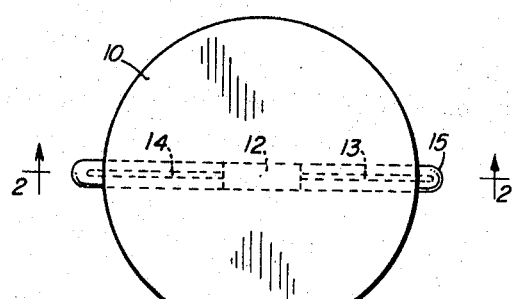
FIGURE 1 is a plan view of the transducer.
Figure 2:
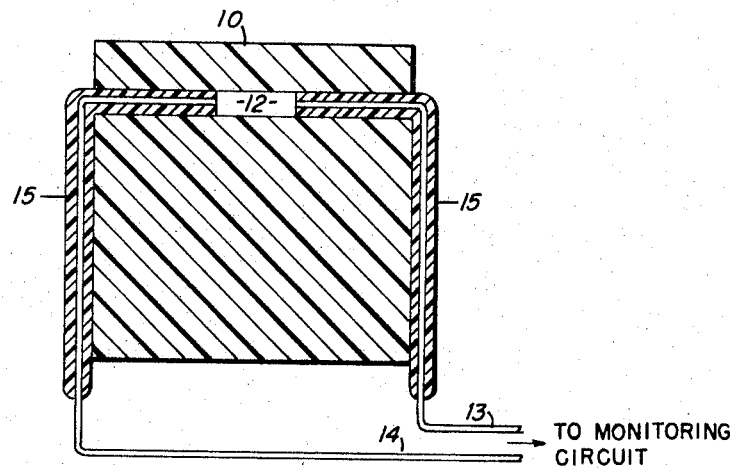
FIGURE 2 is a vertical section of the device taken along the line 2—2 of FIGURE 1.

Referring to the drawing, there is shown the transducer of the instant invention comprising a pressure acceptor block 10, constructed of a resinous material, preferably of polyethylene. The resinous material may comprise any structural plastic suitable for coupling with a pressure sensitive resistor element such as a carbon resistance. The acceptor block of the preferred embodiment has a diameter of about 1 inch and about the same height. Encapsulated, or otherwise contained therein is a carbon resistor 12 having electrical leads 13 and 14 attached thereto. The leads are insulated by resin material 15 and are connected to a monitoring circuit described herein.

The pressure acceptor 10 serves to sample the shock pressure to be measured. In use, it is placed in intimate contact with the pressure source. Consider, for example, a shock wave in a metal plate. When the shock wave arrives at the interface between the metal plate and the pressure acceptor A, a shock wave, having a magnitude which depends on the physical properties of both the metal plate and the pressure acceptor as well as the magnitude of the shock incident in the interface, is sent into the pressure acceptor. If the pressure delivered to the acceptor is known, the magnitude of the pressure in the metal plate can be determined by means of impedance mismatch equations or by means of the pressure-particle velocity matching technique using the shock Hugoniot relations for the plate, as presented in an article by Walsh, J. M., M. H. Rice, R. G. McQueen, and F. L. Yarger, "Shock-Wave Compressions of Twenty-Seven Metals. Equations of State of Metals," Phys. Rev., vol. 108, No. 2, Oct. 15, 1957, and for the acceptor, as discussed by Bert, C. W., E. J. Mills, D. N. Gideon, and R. A. Stein, "Preliminary Survey on Hypervelocity-Impact Properties of Plastics and Plastic Laminates" (BAT-197-16-7), ARPA Order No. 197, Battelle Memorial Institute, Columbus, Ohio, June 1963. Development work has been carried out using polyethylene as the acceptor material.

The pressure sensitive element 12 is used to convert the pressure delivered to the pressure acceptor into an electrical signal having a magnitude proportional to the magnitude of the delivered pressure. An important aspect of this invention is the discovery that an ordinary composition carbon resistor, of the type universally used in electrical circuits, can serve this purpose. The term "composition carbon resistor" is well known in the art as illustrated by the references thereto in Pender and McIlwain, 4th ed., Wiley Engineering Handbook Series, New York, 1950, section 3–11, in U.S. Patents 2,767,289 and 2,347,-795. Broadly, this type of resistor consists of an inert material or filler such as talc, and a finely divided carbon or graphite which are rigidly bonded together with a thermo or chemo-setting binder to form a solid, normally non-deformable rigid resistance mass which is often surrounded by a substantial housing of insulating material, such as mineral-filled Bakelite. It was found that when the resistance element is subjected to a suddenly applied pressure, the resistance decreases from its initial value to a lower value depending on the applied pressure. The response time was found to be extremely rapid, corresponding roughly to the time required for the shock wave to completely transverse the body resistive element. These times are of the order of tenths of a microsecond. In addition it was found that the resistive element responds to rapidly decreasing pressure indicating the possible applicability to the measurement of pressure pulse profiles.

Figure 3:
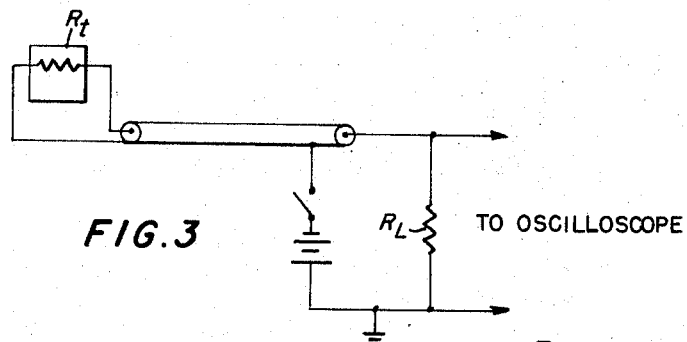
FIGURE 3 shows the associated electrical circuitry used for determining the dynamic resistance of the pressure sensitive element.

A typical monitoring circuit used for determining the dynamic resistance of the pressure sensitive element is shown in FIGURE 3 of the disclosure drawing. The pressure sensitive element, typically a 470 ohm, 1/10 watt composition carbon resistor of cylindrical form having a length of approximately 3/16 inch and a diameter of roughly 1/16 inch, is connected in series with:

(a) A current viewing resistor $R_L$ having a resistance of about 2 percent of the static resistance of the pressure sensitive element or about 10 ohms.

(b) A source of constant voltage $E_o$ usually consisting of a 6-volt battery having an internal resistance, $R_i$, of approximately 1.0 ohm.

(c) A single sweep high-speed oscilloscope used to monitor the voltage appearing across the current viewing resistor $R_L$.

In a typical application, for example the measurement of the pressure delivered by a detonating explosive, the following procedure is used. Prior to the measurement the switch is closed causing a current $I_1$ to flow in the circuit. The magnitude of the current is from Ohm's law:

$$I_1 = \frac{E_o}{R_i + R_L + R_t}$$

where $E_o$=open circuit battery voltage; $R_i$=internal resistance of battery; $R_L$=value of current viewing resistance; and $R_t$=static resistance of pressure sensitive element. The value of $E_o$ is chosen such that the power dissipated in the pressure sensitive element is well below the specified operating level, assuring minimal heating during this operational phase. The explosive charge is then detonated and at the same time the oscilloscope sweep is triggered. When the pressure pulse arrives at the pressure sensitive element, the resistance of the element changes from the static value, $R_t$, to some minimum value $R_t$ (min.) depending on the peak magnitude of the pressure delivered to the pressure acceptor. This causes an additional current $I_2$ to flow in the circuit, producing a proportional increase in the voltage across the current viewing resistor. The current I is equal to $E_p/R_L$ where $E_p$ is the peak magnitude of the voltage pulse appearing on the oscillogram and is determined from the maximum deflection of the sweep and a knowledge of the oscillograph deflection sensitivity. The maximum current, $I_1+I_2$, is then used to calculate the values of $R_t$ (min.) as follows:

$$I\ \text{max.} = \frac{E_o}{R_i+R_L+R_t(\text{min.})} = \frac{E_o}{R_i+R_L+R_t} + \frac{E_p}{R_L}$$

or $$R_t\ (\text{min.}) = \frac{E_o R_L (R_i+R_L+R_t)}{E_o R_L + (R_i+R_L+R_t)} - (R_i+R_L)$$

The pressure delivered to the pressure acceptor is then determined from a previously established calibration curve of peak pressure versus minimum dynamic resistance.

The following data have been obtained using this invention:

(1) A peak acceptor pressure versus minimum dynamic resistance calibration curve over the pressure range from 13 to 70 kilobars with corresponding donor pressures of 16.5 to 185 kilobars. Observed response times are found to be approximately 0.2 microsecond; reproducibility is found to be approximately 5% over the pressure range indicated.

(2) Experiments with independently calibrated shock sources of different shock impedance have verified the shock matching techniques used to deduce the pressure incident on the shock source-acceptor interface.

(3) Trials have been performed indicating the applicability of the invention in measuring pressure-pulse profiles.

(4) Multiple shock trials have been carried out indicating that the transducers will respond to additional increases in pressure applied during or after the passage of the initial wave.

Aside from its applicability on the measurement of dynamic pressures, this invention could be used in a variety of simple high-speed firing devices based upon either shock pressure arrival times or preselected pressure amplitudes. Consider the following example: A resistive element, a voltage source, and a high-speed detonator are connected in series. The steady state current, determined by the static resistance of the element and the applied voltage, is maintained at a level that is incapable of activating the detonator. When a shock wave passes over the pressure sensitive elements, the dynamic resistance suddenly decreases allowing sufficient current to pass through the circuit to fire the detonator. By a suitable choice of components these events could be caused to occur in times of the order of a few microseconds or less, or by including suitable delay network the time between the arrival of the shock wave and the firing of the detonator could be varied at will. In addition, by combining several of these simple circuits the precise control of a chain of detonations could be brought about. By proper positioning of the various charges in the exposive train, shock and blast wave shaping could easily be accomplished. This simple arrangement of components results in a device that should have widespread research, military, and industrial application. Some typical illustrations are:

(a) Blast sequencing in the mining industry.
(b) Wave shape control in the explosive formation of metals.
(c) Warhead fragmentation control.
(d) Impact triggering devices for artillery shells.
(e) Controlled sequencing of a chain of explosive bolts.

In addition to the devices listed above, the basic components of this invention could be arranged to serve as a simple transient pressure alarm system suitable for indicating the occurrence of a shock or blast pressure pulse of arbitrary of preselected amplitude. For example, the application of a sudden pressure would result in a voltage pulse appearing across the current viewing resistor, shown in the patent drawings, that could be used to trigger a thyratron, thus activating additional elements in the circuit such as alarms, indicators, solenoidal valves, etc.

The invention has been illustrated by specific example but there is no intent to limit the invention to the specific details so disclosed in the description and drawing, except insofar as set forth in the following claim.

What is claimed is:

A dynamic pressure transducer having a pressure response time about 0.2 microsecond comprising a pressure sensitive, normally nondeformable, rigid, carbon resistor of the composition carbon type, said resistor being completely encapsulated within a rigid polyethylene block, said block having a mass and volume many times greater than said resistor, said resistor further having associated therewith electrical conducting leads extending from electrical connections therewith to the exterior of said block.

References Cited

UNITED STATES PATENTS

| | | | |
|---|---|---|---|
| 1,317,774 | 10/1919 | Bradley | 338—101 |
| 1,859,765 | 5/1932 | Burleigh | 338—109 |
| 1,895,519 | 1/1933 | Peters | 338—101 |
| 2,171,793 | 9/1939 | Huth | 338—100 X |
| 2,472,214 | 6/1949 | Hurvitz | 338—114 |
| 2,624,822 | 1/1953 | Becker | 338—100 |
| 2,626,381 | 1/1953 | Olson | 338—114 X |
| 2,734,978 | 2/1956 | Bulgin | 338—114 |
| 2,814,203 | 11/1957 | Dononhoe | 73—398 |
| 2,851,569 | 9/1958 | Potter | 338—47 |
| 2,906,980 | 9/1959 | Traite | 338—4 |
| 2,959,056 | 11/1960 | Traite et al. | 73—398 |
| 3,205,464 | 9/1965 | Schwartz | 338—6 |

RICHARD M. WOOD, *Primary Examiner.*

A. BARTIS, *Examiner.*

W. D. BROOKS, *Assistant Examiner.*